United States Patent [19]

Hosoda et al.

[11] Patent Number: 5,498,435
[45] Date of Patent: Mar. 12, 1996

[54] RICE GRAIN-LIKE LOW-CALORIE FOOD

[75] Inventors: Shinya Hosoda; Yukie Hosoda; Eishin Kato, all of Fukui, Japan

[73] Assignee: Sugiyo Co., Ltd., Ishikawa, Japan

[21] Appl. No.: 165,855

[22] Filed: Dec. 14, 1993

[30] Foreign Application Priority Data

Dec. 17, 1992 [JP] Japan ................................ 4-336912
Nov. 18, 1993 [JP] Japan ................................ 5-289529

[51] Int. Cl.⁶ ........................................................ A23L 1/05
[52] U.S. Cl. ................ 426/573; 426/575; 426/578; 426/658; 426/661; 426/804
[58] Field of Search ................................ 426/575, 576, 426/573, 804, 658, 661

[56] References Cited

U.S. PATENT DOCUMENTS

| | | | |
|---|---|---|---|
| 4,269,863 | 5/1981 | Inagami et al. | 426/550 |
| 4,707,376 | 11/1987 | Muraoka et al. | 426/658 |
| 4,851,394 | 7/1989 | Kubodera | 514/54 |
| 5,116,631 | 5/1992 | Sakamoto et al. | 426/568 |
| 5,126,143 | 6/1992 | Nakashima et al. | 424/439 |
| 5,387,423 | 2/1995 | Emoto et al. | 426/104 |

*Primary Examiner*—Donald E. Czaja
*Assistant Examiner*—Lien Tran
*Attorney, Agent, or Firm*—Nikaido, Marmelstein Murray & Oram

[57] ABSTRACT

A rice grain-like low-calorie food which consists of an aqueous dispersion gel whose dispersoids are glucomannan, starch and dietary fiber. It further contains as a dispersoid thickening polysaccharides containing alginates and/or carrageenan, and the content of the starch is about 0.1–3 parts by weight to 1 part by weight of the glucomannan. This low-calorie, rice grain-like food has an appearance and texture resembling that of cooked-rice grains and has excellent freeze resistance, even if the amount of added starch is low with respect to the glucomannan.

12 Claims, No Drawings

RICE GRAIN-LIKE LOW-CALORIE FOOD

BACKGROUND OF THE INVENTION

1. Field of the Invention

The present invention relates to a rice grain-like low-calorie food having glucomannan, a type of thickening polysaccharide, as the base thereof, and particularly it relates to a substance which is suitable to be mixed with rice and cooked to prepare a food.

Unless otherwise specified, the use of "part" and "%" in expressing the composition units in the following explanation refers to weight units.

2. Description of the Prior Art

Konjak gel, which is a food prepared using as a raw material glucomannan obtained from konjak tuber and the like, contains a poorly digestible polysaccharide as a main ingredient, and thus it has received attention not only as a weight-prevention diet food (low-calorie food), but also as a food with a prophylactic effect against adult diseases and a promoting effect for defecation.

Konjak gel is mostly used for the preparation of cooked foods and sauce-topped dishes by cutting flat konjak or stringy konjak into an appropriate size. Recently, the use of stringy konjak as a diet food for overweight people has been proposed, by cutting it finely, and mixing and cooking it with rice, for a reduction in the amount of intake of rice and decrease in calories. (See "Hanayo Sumi's Low-Calorie Cooking", Esse separate volume, issued by Fuji Television publication, p.44).

Nevertheless, it is somewhat bothersome to cut stringy konjak into small rice-size bits using a kitchen knife, and thus it would be convenient to have in a rice grain-like form konjak. Furthermore, a rice grain-like low-calorie food (hereunder referred to as "rice grain-like food") using a konjak ingredient (glucomannan) as the base and resembling rice grains in its appearance and texture, would facilitate a greater intake of the konjak ingredient, and would thus be desirable.

One such example of a rice grain-like food which has been proposed is a rice grain-like low-calorie food prepared by an aqueous dispersion gelating in an alkali solution of a mixture comprising added starch, cellulose (dietary cellulose) and pregelantinized starch, added to konjak paste (see Japanese Patent Application Publication HEI 5- 53461).

However, the amount of added starch in this rice grain-like low-calorie food is as high as 4–13 parts per part of refined konjak flour (see column 5, lines 15–16 of the above mentioned Patent Application Publication), and therefore although its calorie content is considerably lower than that of normal rice, when it is mixed and cooked with rice its calorie contribution cannot be ignored, and thus it is may hardly be said to be a diet food. Incidentally, in an Example in the above mentioned Patent Application Publication, it is mentioned that the per 100 gram calorie content of the rice is about 150 kcal, while that of the rice grain-like food is 33 kcal (see column 7, line 15 - column 8, line 3).

Here, reduction of the amount of added starch has been considered, but it is assumed that this will cause the above mentioned rice grain-like low-calorie food to have insufficient freeze resistance, and also to have an appearance and texture closer to that konjak gel, thus losing the appearance and texture of rice grains.

The above mentioned rice grain-like food is desired to have excellent freeze resistance, from the point of view of distribution and preservation of the food, etc., but a reduction in the amount of added starch, which acts also as a freeze resistant agent, means that the relative glucomannan content becomes higher, which leads to denaturation upon freezing, as in the case of konjak, etc., causing an irreversible loss of the form and appearance as compared to that prior to freezing, and thus it becomes unsuitable for use as a food material. It is stated in the Claims and elsewhere in Japanese Patent Laid-Open Publication No. SHO 62-175149 that, to achieve freeze resistance, it is necessary to incorporate starch at a proportion of 3–7 parts per part of refined konjak flour (glucomannan).

Also, the rice grain-like low-calorie food according to the above mentioned Patent Application Publication has had, when mixed and cooked with rice, a specific gravity approaching that of water, and a layer of this rice grain-like material has tended to separate from the rice and to accumulate on the surface, making it difficult to mix and cook the ingredients to prepare a uniform food product.

SUMMARY OF THE INVENTION

The purpose of the present invention is to provide a low-calorie rice grain-like food which, despite a low proportion of added starch to glucomannan, resembles cooked-rice grains in its appearance and texture, and has excellent freeze resistance, as well as a method for the production thereof.

The low-calorie rice grain-like food and method for its production according to the present invention accomplish the above mentioned object by having a construction whereby a rice grain-like low-calorie food composed of an aqueous dispersion gel whose dispersoids are glucomannan, starch and dietary fiber, further contains as dispersoids thickening polysaccharides containing alginates and/or carrageenan, with an added starch content of about 0.1–3 parts per part of glucomannan.

The low-calorie rice grain-like food and method for its production according to the present invention exhibits the following activity and effects.

It is a low-calorie food, and despite its low starch content, it has a round, smooth appearance similar to cooked-rice grains, and its texture contains no roughness and is no different from that of cooked-rice (see Table 2).

In addition, when mixed and cooked with rice, it mixes uniformly with no separation from the rice grains, there is no unpleasantness or characteristic odor of konjak, and even when kept in an insulated container, it does not become lean and gives no unpleasantness (see Table 3).

Furthermore, even with thawing after freezing storage, no changes are found in the appearance, such as degeneration upon freezing and the formation of sponge-like deformities on the surface, as is usual with konjak, while the surface is smooth, the texture still retains the rice grain-like elasticity, and there is almost no difference from its condition prior to freezing, and therefore, similar to cooked-rice, it may be eaten during or after freezing and thawing, with no unpleasantness (see Table 4).

It is thought that the special thickening polysaccharides and starch to be used according to the present invention produce a synergistic effect which increases the effect of preventing the breakdown of the reticulate structure of the glucomannan due to freezing.

The rice grain-like food according to the present invention may be used not only in combination with rice products, such as boiled rice, cooked rice with fish, fried rice, rice pilaf, rice balls, etc., but also as a part of food materials for various foods, including noodles, bread, hamburger, sauce-topped foods, soups, and the like. In addition, since there is no reduction in their product value by freezing, these foods may be sent through the distribution process as frozen foods.

In other words, the rice grain-like food according to the present invention contains only a slight amount of energy (calories) which may be essentially ignored, and thus it is excellent for use as a diet food which may be mixed with various high-calorie foods.

DESCRIPTION OF THE PREFERRED EMBODIMENTS (1) As a general concept, a requisite for the rice grain-like low-calorie food according to the present invention is that it is composed of an aqueous dispersion gel whose dispersoids are glucomannan, starch and dietary fiber. Here, the amount of water in the aqueous dispersion which forms the aqueous dispersion gel differs depending on the constituents of the dispersoids, but usually it is 5–20 times that of the total dispersoids.

(2) As the glucomannan to be used as the basic ingredient may be suitably used refined glucomannan, konjak flour, refined konjak flour, or the like.

The content of the glucomannan is about 5–70% (preferably 15–55%) of the total dispersoids. If the amount of the glucomannan is too small, it is difficult to form a glucomannan gel, while if it is too large, then its appearance and texture approaches that of konjak gel, and it is difficult to obtain the appearance and texture of cooked-rice grains.

(3) As the above mentioned starch may be used starches from, e.g., potato, corn, tapioca, wheat, sweet potato, and the like, as well as processed starch prepared using these raw ingredients which have undergone various forms of processing such as thermal treatment, acid treatment, acetylation, phosphorylation, etherification, cross-linking, etc., glutinous flour made from cereals such as glutinous rice flour, rice flour, wheat, etc. Particularly suitable for use are potato starch, processed starch, glutinous rice flour and rice flour.

The above mentioned starch cooperates (functions synergistically) with alginates and/or carrageenan mentioned below, to impart freeze resistance and prevent leanness in an insulated container. A further role of the starch is to cooperate with the dietary fiber and thickening polysaccharides to impart to the rice grain-like food an appearance (including color) and texture resembling that of cooked-rice grains.

The starch content is usually about 0.1–3 parts (preferably 0.2–2.5 parts) per part of glucomannan. At less than 0.1 parts, the combination effect of the above mentioned starch (particularly the imparting of freeze resistance) is not easily exhibited, and at greater than 3 parts the calorie level of the rice grain-like food becomes relatively high, and calorie reduction is difficult.

(4) Dietary fiber refers to dietary fiber which is practically insloluble or very slightly soluble in water. Micro crystalline cellulose, celluloses obtained from wheat, pea, sweet potato, soybean, etc. or a molecular dispersion of starch and cellulose (trade name: Sexel), etc. may be used. Particularly suitable for use are microcrystalline, sweet potato cellulose and molecular dispersions of starch and cellulose.

The contribution of the dietary fiber is less than that of the starch, but it performs the same role as the starch, and by replacing part of the starch with it, it is possible to relatively lower the amount of starch to be added to the glucomannan, thus reducing the calorie level of the rice grain-like food.

The dietary fiber content is usually 0.1–6 parts (preferably 0.3–3 parts) per part of glucomannan, and usually 0.1–20 times (preferably 0.3–10 times) that of the starch. If the dietary fiber content is too high, then the texture of the rice grain-like food will not be smooth, and it will be difficult to obtain a texture resembling cooked-rice grains.

(5) The thickening polysaccharides refers to polysaccharides which exhibits a thickening effect when added to an aqueous dispersion, and in addition to the essential components, alginates, carrageenan, etc., may be mentioned locust bean gum, jelan gum, curdlan, xanthan gum, guar gum, agar, faselleran gum, pectin, and the like. Alginates suitable for use include sodium alginate, ammonium alginate, alginic acid, etc.

Here, the alginates and/or carrageenan coact with the starch to provide the effects of imparting freeze resistance and the prevention of leanness in an insulated container. In addition, along with the thickening polysaccharides they play the role of imparting to the rice grain-like food an appearance and texture resembling that of rice grains.

The content of the thickening polysaccharides is usually about 0.05–3 parts (preferably 0.2–1 part) per part of glucomannan. Also, the content of the alginates and/or carrageenan in the thickening polysaccharides is about 20% or greater (preferably about 40% or greater).

If the content of the thickening polysaccharides (particularly the alginates and/or carrageenan) is excessively low, then the effects of the addition (particularly, improving freeze resistance and resistance to leanness during preservation) will be difficult to achieve, and if it is excessively high, then the gel strength will be too great making it difficult to obtain the appearance and texture of cooked-rice grains.

(6) Of the above mentioned insoluble calcium salts are suitable for use pure salts such as calcium phosphate, calcium hydrogen phosphate, calcium carbonate, etc. which are very slightly soluble to insoluble in water, salts such as non-calcinated calcium of egg shells, shellfish shells, coral, bone, etc. and calcinated bone calcium, etc. derived from natural products. Particularly suitable for use are calcium phosphate, calcium hydrogen phosphate, non-calcinated shell calcium and calcinated bone calcium.

The content of the insoluble calcium salt is within about 30% (preferably within 20%) of the total amount of the above mentioned dispersoids (glucomannan, starch, dietary fiber, thickening polysaccharide, calcium salt), depending on the specific gravity demanded for the rice grain-like food. If this content is exceeded, then the rice grain-like food will become too white, thus differing from the color of cooked-rice grains, which is not desirable.

Soluble calcium sulfate and the like are eluted out during washing with water, thus lowering their content, which is not desirable.

(7) The rice grain-like low-calorie food according to the present invention may utilize the above mentioned ingredients and may be produced in the following manner.

(i) The dispersoids (glucomannan, starch, dietary fiber, thickening polysaccharides including alginates and/or carrageenan, and if necessary a calcium salt) are added to water, whose amount is about 5–20 times that of the total dispersoids, mixed, and allowed to swell (be gelatinized) for about 1–2 hours. The mixture is preferably subjected to thermal treatment (for example, about 60° C. for around 30 minutes) for completion of the swelling (gelatinization).

(ii) The resulting paste is pushed through a grid into a woolly form, and then cut to grains of a suitable length and soaked in an alkali solution (usually pH 9–13) at 50°–90° C. for gelation. Alternately, an alkali solution may be added to the paste and the mixture mixed well and pushed through a grid, cut to a suitable length to make grains, and then soaked in hot water at 50° C. or higher for gelation. The alkali solutions to be used for the above mentioned gelatin may be alkalis such as sodium hydroxide, calcium hydroxide, sodium carbonate, etc. or calcinated calcium of egg shell, shellfish shell, coral, etc., dissolved or suspended in water. If necessary, a saccharide, a salt of a basic amino acid, sodium chloride, calcium chloride, or the like may be present therewith.

(iii) This gel may be washed with water, and if necessary, neutralized by immersion in a dilute organic acid, to obtain a rice grain-like food according to the present invention which is odorless and ellipsoid-shaped. The organic acids to be used for the neutralization may be citric acid, tartaric acid, acetic acid, or the like.

(iv) The rice grain-like food obtained in this manner is preferably subjected to thermal sterilization at 90° C. or higher, depending on the need, in the case of storage other than freezing storage, such as at room temperature.

EXAMPLES

An explanation of the present invention is provided below with respect to the Examples and Comparisons, in order to show its effects. All of the rice grain-like foods were filled into plastic bags and sealed, subjected to thermal sterilization at 120° C. for 25 minutes, and then stored at room temperature.

A. Example Groups, Comparison Groups

Example 1

(1) A 2.5 part portion of the dispersoids in the composition listed in Table 1 was added to 40 parts of water, with stirring, and the mixture was stirred for 30 minutes, allowed to stand for 1 hour and then kept at 60° C. for 30 minutes to obtain a paste.

(2) This paste was pushed through a grating (pore size: 3.5 mm) and cut with a cutter as it came through to obtain grains (cylindrical shapes about 8 mm in length).

(3) The grains were immersed in an 80° C. aqueous alkali solution [0.2% $CaCl_2$, 0.3% $Ca(OH)_2$] for 15 minutes to obtain a gel.

(4) The gel was washed with water and immersed/neutralized in an aqueous solution of citric acid of pH 3 for 1 hour to obtain a rice grain-like food.

Example 2

(1) A 5.0 part portion of the dispersoids listed in Table 1 was added to 42.5 parts of water with stirring, and the mixture was stirred for 30 minutes, allowed to stand for 30 minutes and then kept at 60° C. for 30 minutes to obtain a paste.

(2) With this paste was mixed 12.5 parts of an alkali solution (aqueous solution containing 0.13% calcinated shell calcium) and then pushed through a grating and cut in the same manner as in Example 1 to obtain grains.

(3) The grains were immersed in hot water at 60° C. for 30 minutes to produce a gel, which was then washed to obtain a rice grain-like food.

Example 3

(1) Of the dispersoids listed in Table 1, 1.36 parts of a mixture of konjak flour, carrageenan and locust bean gum was added to 20 parts of water with stirring, and then a solution of 15.2 parts of rice flour, processed starch and fiber paste suspended in 14 parts of water was poured thereinto, a solution of 0.3 parts of sodium alginate in 10 parts of water was further poured thereinto, and the mixture was stirred for 1 hour, and then kept at 60° C. for 30 minutes to obtain a paste.

(2) This paste was extruded and cut in the same manner as in Example 1 to obtain grains.

(3) The grains were immersed in a 70° C. aqueous alkali solution (same composition as in Example 1) for 15 minutes to obtain a gel.

(4) The gel was treated in the same manner as in Example 1 to obtain a rice grain-like food.

Comparison 1

The same procedure was followed as in Example 1, except that the sodium alginate and the calcinated bone calcium were not used.

Comparison 2

The same procedure was followed as in Example 2, except that the carrageenan was replaced with locust bean gum (the 0.5 parts of thickening polysaccharides was all locust bean gum) and the sodium hydrogen phosphate was not used.

Comparison 3

The same procedure was followed as in Example 3, except that all of the thickening polysaccharides were replaced with 0.36 parts of agar.

B. Test Items and Evaluation Results

The products prepared in each of the above mentioned Examples and Comparisons (after preservation for one day at room temperature) and commercially available grain-shaped konjak (product of A Co.) were used as the samples, for the following test items.

(1) Calories

The calories per 100 g of each of the rice grain-like foods in the Examples were measured in the following manner.

To one gram of each sample was added 50 ml of a 0.02M acetate buffer solution of pH 4.8 and homogenized. After addition of 2 mg of glucoamylose the mixture was incubated at 58° C. for 5 hours, and filtered with a filter paper. The amount of the reducing sugars in the filtrate was measured by the Somogyi method, and the energy conversion factor of glucose (3.68 kcal/g) was applied thereto to calculate the calories per 100 g of the rice grain-like food.

The results were found to be 2 kcal for Example 1, 10 kcal for Example 2 and 5 kcal for Example 3, which were all 10% or lower values compared with the approximately 150 kcal for rice.

(2) Initial Appearance/Texture Test

The samples were taken out of their bags for observation of the appearances and examination of the textures. The results are shown in Table 2.

Each of the Examples which had incorporated sodium alginate and/or carrageenan had an appearance similar to that of cooked-rice grains, the surface was smooth and the texture had no roughness to it, providing the same feel to the teeth and tongue as cooked-rice grains, while there was none of the characteristic odor of konjak when the plastic bags were opened.

In contrast, each of the Comparisons, which contained no sodium alginate and/or carrageenan among the thickening polysaccharides, was as masticable as konjak and had a cylindrical appearance, exhibiting none of the effects according to the present invention.

(3) Mixing and cooking test

To 300 g portion of well-milled rice washed with water well added 360 ml of water and 200 g of each sample and mixed therewith, and the mixture was cooked by a common method, mixed and kept overnight in an insulated container, after which the test was conducted by observing the appearance and examining the texture. The results are shown in Table 3.

Each of the Examples which incorporated sodium alginate and/or carrageenan mixed uniformly with the rice grains and could not be distinguished therefrom, while the texture was not unpleasant, being identical to that of normal cooked-rice. Furthermore, no leanness or unpleasant texture was found even after it was kept overnight.

In contrast, each of the Comparisons, which contained no sodium alginates and/or carrageenan among the thickening polysaccharides and no insoluble calcium salts, separated into a layer at the top of the mixture, and leanness was found after preservation, while the texture was unpleasant both during cooking and after insulated preservation.

(4) Freeze Resistance Test

Each of the samples was allowed to stand for one day in a freezer at −20° C., and then thawed at room temperature, and the appearance and texture thereof were compared to that prior to freezing. The results after thawing are shown in Table 3.

All of the Examples which incorporated sodium alginate and/or carrageenan had smooth appearances and exhibited textures which retained the elasticity of cooked-rice, even after freezing and thawing, little different from those prior to freezing.

In contrast, each of the Comparisons, which contained no sodium alginates and/or carrageenan among the thickening polysaccharides, exhibited liberation of water more or less, and the surface thereof was irregular and sponge-like, with a texture which was hard, lacked elasticity, and felt rough.

TABLE 1

| | Example 1 | | Example 2 | | Example 3 | |
| --- | --- | --- | --- | --- | --- | --- |
| Glucomannan | Konjak flour | 1 part | Refined glucomannan | 1 part | Konjak flour | 1 part |
| Starch | Potato starch | 0.25 part | Glutinous rice flour | 2.3 parts | Rice flour processed starch | 0.4 part *1 0.8 part |
| Dietary fiber | Microcrysrtalline cellulose | 0.83 part | Microcrysrtalline cellulose | 0.75 part | Fiber paste *2 | 14.0 parts (1.4 parts) |
| Thickening polysaccharides | Sodium alginate | 0.3 part | Carrageenan Locust bean gum | 0.25 part 0.25 part | Carrageenan Guar gum Locust bean gum Sodium alginate | 0.24 part 0.12 part 0.12 parts 0.3 part |
| Insoluble calcium salt | Calcinated bone | 0.12 part | CaHPO$_4$ | 0.45 part | — | |
| Parts of total dispersoids | 2.5 parts | | 5.0 parts | | 16.98 parts (4.38 parts) | |

*1 Trade name "Yuri", product of Matsutani Chemical Industry co., LTD.
*2 Decolored sweet potato fiber paste: 10% fiber Contents calculated in terms of fiber are in parentheses.

TABLE 2

INITIAL APPEARANCE AND TEXTURE TEST

| Sample | Appearance | Texture |
| --- | --- | --- |
| Example 1 | White, odorless rice grain-like (cross-section: long ellipsoid) | Weak elasticity, smooth surface, masticability similar to normally cooked rice grains |
| Example 2 | White, odorless Rice grain-like (cross-section: long ellipsoid) | Weak elasticity, smooth surface, masticability similar to normally cooked rice grains |
| Example 3 | White, odorless Rice grain-like (cross-section: long ellipsoid) | Weak elasticity, smooth surface, masticability similar to normally cooked rice grains |
| Comparison 1 | White, odorless Cylindrical (cross-section: rectangular) | Rather hard and elastic, roughfeel and masticability similar to soft konjak |
| Comparison 2 | White, odorless Cylindrical (cross-section: rectangular) | Elastic as rice cake, masticability similar to soft konjak |
| Comparison 3 | White, odorless Cylindrical (cross-section: rectangular) | Rather hard and elastic, rough feel and masticability similar to soft konjak |
| Commercial | White, characteristic odor of konjak, cylindrical (cross-section: rectangular) | Hard and elastic, rough feel and masticability characteristic of konjak |

TABLE 3

Mixing and Cooking Test

| Sample | Time | Appearance | Texture |
|---|---|---|---|
| Example 1 | When cooked | Uniformly mixed, indistinguishable, odorless | No unpleasant feel |
| | After storage | Not lean, indistinguishable, odorless | No unpleasant feel |
| Example 2 | When cooked | Uniformly mixed, indistinguishable, odorless | No unpleasant feel |
| | After storage | Not lean, indistinguishable, odorless | No unpleasant feel |
| Example 3 | When cooked | Uniformly mixed, indistinguishable, odorless | No unpleasant feel |
| | After storage | Not lean, indistinguishable, odorless | No unpleasant feel |
| Comparison 1 | When cooked | Separated layer on top, odorless | Slight unpleasant feel |
| | After storage | Slightly lean, distinguishable, odorless | Slight difference in elasticity, unpleasant feel |
| Comparison 2 | When cooked | Separated layer on top, odorless | Slight unpleasant feel |
| | After storage | Slightly lean, distinguishable, odorless | Different elasticity, unpleasant feel |
| Comparison 3 | When cooked | Separated layer on top, odorless | Slight unpleasant feel |
| | After storage | Slightly lean, distinguishable, odorless | Different elasticity, unpleasant feel |
| Commercial product | When cooked | Separated layer on top, characteristic odor of konjak | Slight unpleasant feel |
| | After storage | Lean, shrunken, easily distinguishable from rice grains, slight characteristic odor of konjak | Hard, giving feel of foreign matter |

TABLE 4

Freeze Resistance Test

| Sample | Appearance | Texture |
|---|---|---|
| Example 1 | Slight liberation of water, white rice grain shape with smooth surface | Smooth with weak elasticity, masticability similar to slightly hard cooked rice grains |
| Example 2 | Almost no liberation of water, white rice grain shape with smooth surface | Smooth with weak elasticity, masticability similar to normal cooked-rice grains |
| Example 3 | Slight liberation of water, white rice grain shape with smooth surface | Smooth with weak elasticity, masticability similar to normal cooked-rice grains |
| Comparison 1 | Much liberation of water, sponge-like rice grain shape with irregular surface | Hard, without characteristic elasticity of konjak, rough feel to the tongue |
| Comparison 2 | Slight liberation of water, sponge-like rice grain shape with irregular surface | Hard, without characteristic elasticity of konjak, rough feel to the tongue |
| Comparison 3 | Some liberation of water, sponge-like rice grain shape with irregular surface | Hard, without characteristic elasticity of konjak, rough feel to the tongue |
| Commercial product | Considerable liberation of water, very small, sponge-like grains resembling agar bars | Extremely hard like rubber, with a rough feel to the tongue |

What is claimed is:

1. A low-calorie food in the shape and size of grains of cooked rice consisting essentially of an aqueous dispersion of particles of gel whose dispersoids are:
   glucomannan,
   0.1 to 3 parts by weight, per part of glucomannan, of starch,
   dietary fiber and
   at least one thickening polysaccharide selected from the group consisting of alginates, carrageenan and mixture thereof.

2. A low-calorie food according to claim 1, wherein the content of said thickening polysaccharides is about 0.05–3 parts by weight to 1 part by weight of said glucomannan.

3. A low-calorie food according to claim 2, wherein said thickening polysaccharide comprises at least about 20% of the alginates and/or the carrageenan.

4. A low-calorie food according to claim 1, further comprising a substantially water-insoluble calcium salt in an amount sufficient to increase the specific gravity of said food.

5. A low-calorie food in paste form which comprising particles of the shape and size of grains of cooked rice, which particles consist essentially of:
   glucomannan,
   0.1 to 3 parts by weight., per part of glucomannan, of starch,
   dietary fiber, and
   a thickening amount of a polysaccharide selected from the group consisting of alginates, a carrageenan and mixture thereof.

6. A low-calorie food paste according to claim 5, wherein the content of said thickening polysaccharides is 0.05–3 parts by weight to 1 part by weight of glucomannan.

7. A low-calorie food paste according to claim 6, wherein said thickening polysaccharide comprises at least about 20% of the alginates and/or the carrageenan.

8. A low-calorie food paste according to claim 5, further containing a substantially water-insoluble calcium salt in an amount sufficient to increase the specific gravity of said paste.

9. A method for the production of a low-calorie food, comprising forming an aqueous dispersion consisting essentially of:
   glucomannan,
   0.1 to 3 parts, per part of glucomannan, of starch,
   dietary fiber, and a thickening amount of a potysaccharide selected from the group consisting alginates, carrageenan, and mixture thereof gelling said aqueous dispersion by treatment thereof with alkali, and recovering said gel in the form and shape of grains of cooked rice.

10. A method for the production of a rice grain-like low-calorie food according to claim 9, wherein the content of the thickening polysaccharides is about 0.05–3 parts by weight to 1 part by weight of glucomannan.

11. A method for the production of a low-calorie food according to claim 10, wherein said thickening polysaccharide comprises at least about 20% of the alginates and/or the carrageenan.

12. A method for the production of a low-calorie food according to claim 9, further comprising adding a substantially water-insoluble calcium salt to said dispersion in an amount sufficient to increase the specific gravity of said dispersion.

* * * * *